(12) United States Patent
Liu et al.

(10) Patent No.: US 10,273,159 B2
(45) Date of Patent: Apr. 30, 2019

(54) METHOD OF PRODUCING GRAPHENE

(71) Applicant: Chung Yuan Christian University, Taoyuan (TW)

(72) Inventors: Wei-Jen Liu, Taoyuan (TW); Pin-Chun Lin, Taoyuan (TW)

(73) Assignee: CHUNG YUAN CHRISTIAN UNIVERSITY, Taoyuan (TW)

( * ) Notice: Subject to any disclaimer, the term of this patent is extended or adjusted under 35 U.S.C. 154(b) by 208 days.

(21) Appl. No.: 15/397,748

(22) Filed: Jan. 4, 2017

(65) Prior Publication Data

US 2018/0186643 A1    Jul. 5, 2018

(51) Int. Cl.
*C01B 32/19* (2017.01)

(52) U.S. Cl.
CPC .................... *C01B 32/19* (2017.08)

(58) Field of Classification Search
CPC ............. C01B 31/04; C01B 31/0407; C01B 31/0415; C01B 31/0423; C01B 31/043; C01B 31/0438; C01B 31/0446; C01B 31/0453; C01B 31/0461; C01B 31/0469; C01B 31/0476; C01B 31/0484; C01B 31/0492; C01B 2204/00; C01B 2204/02; C01B 2204/04; C01B 2204/06; C01B 2204/065; C01B 2204/20; C01B 2204/22; C01B 2204/24; C01B 2204/28; C01B 2204/30; C01B 2204/32; C01B 32/182; C01B 32/198; C01B 32/20; C01B 32/215; C08K 3/042; C08K 3/20; C21D 2211/006; C04B 14/024; C04B 2235/425; C04B 35/536; C04B 35/52; C04B 2235/5248; C10M 103/02; C10M 113/02; C10M 125/02; C10M 2201/041; C10M 2201/042; C22C 37/04; C03C 25/44; C09C 1/46; C21C 1/10

See application file for complete search history.

(56) References Cited

U.S. PATENT DOCUMENTS

2016/0167011 A1* 6/2016 Liu ..................... C01B 31/0446
                                                  204/157.42

OTHER PUBLICATIONS

Nacken, et al., Delamination of graphite in a high pressure homogenizer, RSC Adv. 2015; 5: 53728-57338 (Year: 2015).*

* cited by examiner

*Primary Examiner* — Daniel McCracken (57) ABSTRACT

Disclosed herein is a method of producing a graphene from a graphite material. The method comprises the step of dispersing the graphite material in a solution, followed by shearing and exfoliating the graphite material produce a graphene-containing solution. The present method does not involve the use of chemical reagent and/or sonication treatment.

17 Claims, 9 Drawing Sheets

METHOD OF PRODUCING GRAPHENE

BACKGROUND OF THE INVENTION

1. Field of the Invention

The present disclosure in general relates to the field of graphene production. More particularly, the present disclosure relates to a method of producing a graphene from a graphite material.

2. Description of Related Art

Within the last few years, graphene has received special attention from the scientific world due to its unique mechanical and electrical properties. It is a material extracted from graphite, in which 1 mm of graphite contains about 3 million layers of graphene. In structural, graphene is an allotrope of carbon in the form of a two-dimensional, atomic-scale, and honey-comb lattice with one atom in thickness.

Graphene has many extraordinary properties. The most useful properties of graphene are its high electrical conductivity and high thermal conductivity. It is reported that the electronic mobility of graphene is about 15,000-200,000 $cm^2/(V·s)$; and the corresponding resistivity of graphene sheets is about $10^{-6}$ $\Omega·cm$ that is the lowest resistivity known at room temperature. As to the thermal conductivity, it is about 1500-2500 W/m·K, which may increase or decrease depending on the level of purity and temperature. Another graphene's stand-out property is its mechanical strength. Graphene is the strongest material ever tested, with an intrinsic tensile strength of 130 GPa and a Young's modulus (stiffness) of 1 TPa (150,000,000 psi). Besides, graphene also contains elastic properties. According to the report, the effective spring constant of graphene ranges from 1 to 5 N/m and the Young's modulus is 0.5 TPa, which is only about half of the Young's modulus of bulk graphite. Further, graphene has remarkable optical property, wherein graphene absorbs 2.3% and reflects <0.1% of normally incident visible light.

Due to these unique properties, graphene is widely applied in various fields, including medicine (such as tissue engineering, bioimaging, polymerase chain reaction (PCR), detection and diagnosis device, drug delivery, and biomicrorobotic system), electronics (such as transistor, transparent conducting electrode, frequency multiplier, optoelectronics, quantum dot, Organic electronics, and spintronics), light processing (such as optical modulator, infrared light detection, and photodetector), energy processing (such as energy generation and energy storage), and water treatment (such as contaminant removal and water filtration).

Recently, several methods for preparing graphene have been developed. However, each method has its limitation, such as low-yield, low-purity, high-cost, high-defect density, and/or small-scale production. Accordingly, there exists in the related art a need for an improved method for efficiently preparing graphene with low-defect density and high electrical conductivity.

SUMMARY

The following presents a simplified summary of the disclosure in order to provide a basic understanding to the reader. This summary is not an extensive overview of the disclosure and it does not identify key/critical elements of the present invention or delineate the scope of the present invention. Its sole purpose is to present some concepts disclosed herein in a simplified form as a prelude to the more detailed description that is presented later.

As embodied and broadly described herein, one aspect of the disclosure is directed to a method of producing a graphene from a graphite material. The present method comprises the steps of,
(a) dispersing the graphite material in a solution to form a graphite suspension; and
(b) shearing and exfoliating the graphite material to produce a graphene-containing solution by subjecting the graphite suspension at a pressure of at least 800 bar and a temperature no more than 30° C.

According to some embodiments of the present disclosure, the pressure is between 800-3,000 bar and the temperature is about 10-20° C. Preferably, the pressure is 2,000 bar.

According to other embodiments of the present disclosure, the graphite suspension is pumped through a nozzle of an ultra-high pressure (UHP) reactor multiple times. In one embodiment, the graphite suspension is pumped through the nozzle three times, and the produced graphene has an average thickness of about 3-5 nm, and a particle size ($d_{50}$) about 10-20 μm. In another embodiment, the graphite suspension is pumped through the nozzle eight times, and the produced graphene has a particle size ($d_{50}$) about 10-15 μm. In still another embodiment, the graphite suspension is pumped through the nozzle twelve times, and the produced graphene has a particle size ($d_{50}$) about 1-10 μm.

According to the embodiments, the solution is selected from the group consisting of, water, methanol, ethanol, 1-propanol, isopropanol, butanol, isobutanol, ethylene glycol, diethylene glycol, glycerol, propylene glycol, N-methyl-pyrrolidone (NMP), γ-butyrolactone (GBL), 1,3-dimethyl-2-imidazolidinone (DMEU), dimethyl formamide, and the combination thereof. Preferably, the solution is water, ethanol, or a combination thereof.

In general, the graphite material is selected from the group consisting of, natural graphite, synthetic graphite, spheroidal graphite ion, carbon fiber, carbon nanofiber, carbon nanotube, mesophase carbon micro-bead, and the combination thereof.

According to some embodiments of the present disclosure, the method does not comprise the step of adding a reducing agent, an oxidizing agent, a surfactant, an acid or an alkaline to the graphite suspension. According to other embodiments of the present disclosure, the method does not comprise the step of sonicating the graphite suspension.

Many of the attendant features and advantages of the present disclosure will becomes better understood with reference to the following detailed description considered in connection with the accompanying drawings.

BRIEF DESCRIPTION OF THE DRAWINGS

The present description will be better understood from the following detailed description read in light of the accompanying drawings, where:

FIGS. 2A and 2B are the data of dynamic light scattering (DLS) assay that depict the particle size of graphene produced by specified pressure for three times.

FIGS. 3A-3D are the data analyzed by atomic force microscopy (AFM) that depict the thickness of graphene produced by 2,000 bar for three times, in which FIG. 3A is the photograph of AFM, and FIGS. 3B-3D respectively represent the thickness of specified areas indicated in FIG. 3A according to one embodiment of the present disclosure;

FIGS. 4A and 4B are the data of DLS assay that depict the particle size of graphene produced by 2,000 bar for specified times.

FIGS. 5A and 5B are the data of DLS assay that depict the particle size of graphene produced by 2,000 bar for specified times.

FIGS. 10A-10D are the data analyzed by AFM that depicts the thickness of graphene produced by 2,000 bar for three times, in which FIG. 10A is the photograph of AFM, and FIGS. 10B-10D respectively represent the thickness of specified areas indicated in FIG. 10A according to one embodiment of the present disclosure.

DETAILED DESCRIPTION OF THE INVENTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

For convenience, certain terms employed in the specification, examples and appended claims are collected here.

Unless otherwise defined herein, scientific and technical terminologies employed in the present disclosure shall have the meanings that are commonly understood and used by one of ordinary skill in the art. Also, unless otherwise required by context, it will be understood that singular terms shall include plural forms of the same and plural terms shall include the singular. Specifically, as used herein and in the claims, the singular forms "a" and "an" include the plural reference unless the context clearly indicates otherwise. Also, as used herein and in the claims, the terms "at least one" and "one or more" have the same meaning and include one, two, three, or more.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in the respective testing measurements. Also, as used herein, the term "about" generally means within 10%, 5%, 1%, or 0.5% of a given value or range. Alternatively, the term "about" means within an acceptable standard error of the mean when considered by one of ordinary skill in the art. Other than in the operating/working examples, or unless otherwise expressly specified, all of the numerical ranges, amounts, values and percentages such as those for quantities of materials, durations of times, temperatures, operating conditions, ratios of amounts, and the likes thereof disclosed herein should be understood as modified in all instances by the term "about". Accordingly, unless indicated to the contrary, the numerical parameters set forth in the present disclosure and attached claims are approximations that can vary as desired. At the very least, each numerical parameter should at least be construed in light of the number of reported significant digits and by applying ordinary rounding techniques.

As used herein, the term "graphene" refers to a single atom thick planar sheet of $sp^2$-bonded carbon atoms which are positioned in a honeycomb crystal lattice. In the context of the present invention, the term "graphene" is also intended to refer to more than one, but less than 10, of these single sheets arranged in a layered structure. Preferred numbers of layers will thus be 1 to 10; preferably, 1 to 8; more preferably, 1 to 5 (e.g. 2 to 10 or 2 to 5). When the graphene, either a single sheet or multiple sheets arranged in a layered structure, has a surface area of more than 0.005 $\mu m^2$ (preferably, in the range of 0.006 to 0.038 $\mu m^2$), then the graphene may be referred to as being in the form of "nanosheets" in the context of the invention. Alternatively, when the surface area of the graphene is less than 0.005 $\mu m^2$, then the graphene may be referred to as being in the form of "nanodots" in the context of the invention. Unless otherwise required by context, it will be understood that the term "graphene" include both pure graphene and graphene with small amounts of graphene oxide.

The term "graphite" is well-known to a skilled artisan and as referred to its traditional meaning of a layered planar structure, each layer comprising a sheet of $sp^2$-bonded carbon atoms. Graphite as referred to herein has at least 11 layers of this hexagonal carbon, which are held together by weak Van der Waals forces. In all embodiments of the present invention, the graphite may be of any type from any source. According to one embodiment of the present disclosure, the graphene is natural graphite, i.e. the unprocessed material. According to another embodiment of the present disclosure, the graphene is synthetic graphite As used herein, the term "shear" refers to fracture, break, or otherwise deform a substance thereby releasing two or more engaged components, parts, or things, or thereby partially or fully separating a single component into two or more components/pieces.

The term "exfoliate" as used herein refers to the process of going from a layered or stacked structure to one that is substantially delaminated or no longer stacked.

The term "particle size distribution" refers to the relative percentages by weight or volume of each of the different size fractions of a particulate matter. The particle size distributions can be measured by sieve analysis, air elutriation analysis, photoanalysis, optical counting method, electroresistance counting method, sedimentation technique, laser diffraction method, laser obscuration time (LOT)/time of transition (TOT), acoustic spectroscopy, ultrasound attenuation spectroscopy, and air pollution emissions measurement. According to one embodiment, the graphene produced by the present method is measured by DLS assay. The term "$d_{50}$" is well-known in the art and refers to the median particle size, i.e., the size where 50% of the particles have a size less than or equal to the value given.

The term "sonication" refers to the application of sound energy at a wave length above 10000 Hz to a liquid or viscous sample. It is known that sonication facilitates the process of exfoliation by creating shear stress and cavitation in the bulk material. However, long sonication time may introduce defects undermining graphene's properties.

As of today, various methods have been developed to produce graphene from different graphite materials. However, each method has its limitations, such as complex process, production of corrosive and toxic gases, difficulty in controlling the thickness and/or number of layers, low yield, and difficulty in achieving the uniform deposition of the carbon. Besides, it is known that high temperature leads to wrinkled graphene due to difference in coefficient of thermal expansion. Accordingly, the present disclosure aims at providing an improved method for efficiently producing high quality graphene.

Thus, the first aspect of the present disclosure is directed to a method of preparing a graphene from a graphite material. According to the embodiments of the present disclosure, the method comprises,
  (a) dispersing the graphite material in a solution to form a graphite suspension; and
  (b) shearing and exfoliating the graphite material to produce a graphene-containing solution by subjecting the graphite suspension at a pressure of at least 800 bar and a temperature no more than 30° C.

In general, the graphite material is selected from the group consisting of, natural graphite, synthetic graphite, spheroidal graphite ion, carbon fiber, carbon nanofiber, carbon nanotube, mesophase carbon micro-bead, and the combination thereof. According to one specific embodiment, the graphite material is natural graphite. According to another embodiment, the graphite material is synthetic graphite.

In the step (a), the graphite material is dispersed in a solution to produce a graphite suspension. According to the embodiments of the present disclosure, the graphite dispersed in the solution is about 160-190 μm or less in sizes. According to some embodiments of the present disclosure, the solution is selected from the group consisting of, water, methanol, ethanol, 1-propanol, isopropanol, butanol, isobutanol, ethylene glycol, diethylene glycol, glycerol, propylene glycol, N-methyl-pyrrolidone (NMP), γ-butyrolactone (GBL), 1,3-dimethyl-2-imidazolidinone (DMEU), dimethyl formamide, and the combination thereof. In one embodiment, the graphite material is dispersed in water. In another embodiment, the graphite material is dispersed in ethanol (100%). In still another embodiment, the graphite material is dispersed in an ethanol/water mixture (65:35, v/v). According to one working example, about 1-3 grams (g) of the graphite material is dispersed in about 100 milliliter (ml) of the solution.

In the step (b), the graphite material is sheared and exfoliated by a pressure treatment under low temperature. According to the embodiments of the present disclosure, the graphite suspension in the step (a) is subjected to an ultra-high pressure (UHP) reactor, which pumps the graphite suspension through the nozzle therein at a specified condition, such as flow rate, pressure, and times. In the embodiments, the pumping pressure is at least 800 bar (80 Mpa); for example, 800 bar, 900 bar, 1,000 bar, 1,100 bar, 1,200 bar, 1,300 bar, 1,400 bar, 1,500 bar, 1,600 bar, 1,700 bar, 1,800 bar, 1,900 bar, 2,000 bar, 2,100 bar, 2,200 bar, 2,300 bar, 2,400 bar, 2,500 bar, 2,600 bar, 2,700 bar, 2,800 bar, 2,900 bar, 3,000 bar, or higher pressure. According to one embodiment, the pumping pressure is 857 bar (85.7 Mpa). According to another embodiment, the pumping pressure is about 1,280 bar (128 Mpa). According to still another embodiment, the pumping pressure is about 1,801 bar (180.1 Mpa). According to further embodiment, the pumping pressure is about 1,956 bar (195.6 Mpa). In one preferred example, the pumping pressure is 2,000 bar (200 Mpa).

According to some embodiments of the present disclosure, the step (b) is carried out at a temperature no more than 30° C.; that is, the temperature may be 4, 5, 6, 7, 8, 9, 10, 11, 12, 13, 14, 15, 16, 17, 18, 19, 20, 21, 22, 23, 24, 25, 26, 27, 28, 29 or 30° C. Preferably, the temperature is about 10-20° C. In one working example, the temperature is 15° C.

According to some embodiments of the present disclosure, the graphite suspension is pumped through the nozzle of the UHP reactor multiple times, each time using the product from the previous run so as to substantially shear and exfoliate the graphite material. According to one embodiment, the graphite suspension is pumped at the pressure of 2,000 bar for three times; and the graphene thus produced has an average thickness of about 3-5 nm, and a particle size ($d_{50}$) about 10-20 μm. According to another embodiment, the graphite suspension is pumped at the pressure of 2,000 bar for eight times; and the graphene thus produced has a particle size ($d_{50}$) of the graphene about 10-15 μm. According to still another embodiment, the graphite suspension is pumped at the pressure of 2,000 bar for twelve times; and the graphene thus produced has a particle size ($d_{50}$) of the graphene about 1-10 μm.

According to one embodiment of the present disclosure, the product of step (b) is then dehydrated in an oven so as to produce the graphene.

According to other embodiments of the present disclosure, the graphene produced by the present method exhibits high uniformity of thickness.

Compared with conventional methods, the present invention is advantageous in that neither the chemical reagent (including reducing agent, oxidizing agent, surfactant, acid, alkaline and etc) nor the sonication treatment commonly used to prepare the graphene, is used in the present method. The reducing agent, oxidizing agent, surfactant, acid and/or alkaline would be commonly understood by and be familiar with the skill artisan. For example, the well-known reducing agents include hydrazine, iodide, phosphine, phosphite, sulfide, sulfite, hydrosulfite, borohydride, cyanoborohydride, aluminum hydride, borane, hydroxylamine, diimine, lithium aluminum hydride, and hydrogen. The oxidizing agents familiar with the skilled artisan include potassium chlorate, sodium chlorate, potassium perchlorate, potassium persulfate, potassium permanganate, potassium dichromate, and hydrogen peroxide. Widely used surfactants during the process of preparing graphene include, anionic surfactant, non-ionic surfactant, cationic surfactant, amphoteric surfactant, silicone surfactant, fluoro-surfactant, polymeric surfactant, sodium hexametaphosphate, sodium lignosulphonate, poly(sodium 4-styrene sulfonate), sodium dodecylsulfate, sodium sulfate, sodium phosphate, and sodium sulfonate. Examples of acid include nitric acid, hydrochloric acid, sulfuric acid, acetic acid, chlorosulfonic acid, fluorosulfonic acid, trifluoromethanesulfonic acid, perchloric acid, phosphoric acid, and phosphorous acid. Examples of alkaline include sodium hydroxide, potassium hydroxide, sodium carbonate, calcium carbonate, and magnesium hydroxide.

Since the present method does not involve using chemical reagents as mentioned above and the whole process is maintained at low temperature, the graphene thus produced exhibits low-defect density. According to one embodiment of the present disclosure, the produced graphene is analyzed by Raman spectroscopy, a technique widely used to characterize the properties of graphene. In general, the Raman spectrum of graphene displays two major peaks that can be used to evaluate the quality of graphene, including G peak (at about 1580 cm$^{-1}$) and 2D peak (at about 2690 cm$^{-1}$). In defective graphene, a third peak at about 1350 cm$^{-1}$ is detected, also known as D peak. While the intensity of G peak remains almost constant, the intensity of D peak rises with the introduction of defect, which increases the $I_D/I_G$ ratio. According to the embodiment of the present disclosure, the $I_D/I_G$ value of the produced graphene is about 0.060-0.064.

According to embodiments of the present disclosure, the yield per batch of graphene is about 100 gram per hour, in which the graphene has an average thickness of about 4-5 nm and a particle size ($d_{50}$) about 4-45 μm.

The following Examples are provided to elucidate certain aspects of the present invention and to aid those of skilled in the art in practicing this invention. These Examples are in no way to be considered to limit the scope of the invention in any manner. Without further elaboration, it is believed that one skilled in the art can, based on the description herein, utilize the present invention to its fullest extent. All publications cited herein are hereby incorporated by reference in their entirety.

EXAMPLE

Materials and Methods

Production of Graphene 1-3 grams of natural or synthetic graphite, about 160-190 μm or less in sizes, was dispersed in 100 ml of water or 100% ethanol to obtain a suspension. The suspension was then subjected to a low temperature ultra-high pressure disrupter (JNBIO-JN10C). The operating conditions were summarized in Table 1. The graphene was dehydrated by placing in an oven (about 40° C.) and stored at room temperature for the following analysis.

TABLE 1

| Condition for preparing graphene | | | | |
|---|---|---|---|---|
| Source (natural synthetic) | Solution (water/100% ethanol) | Pumping pressure (bar) | Temperature (° C.) | Pumping rate (L/h) |
| Natural | water | 857 | 15 | 10 |
| Natural | water | 1280 | 15 | 10 |
| Natural | water | 1801 | 15 | 10 |
| Natural | water | 1956 | 15 | 10 |
| Natural | ethanol | 2000 | 15 | 10 |
| Artificial | water | 2000 | 15 | 10 |

Example 1 Production of Graphene from Natural Graphite

In this example, the natural graphite was dispersed in water (1%, w/w). The graphene produced by specified condition was analyzed by SEM, DLS and AFM, and the results were respectively illustrated in FIGS. 1-8.

Figure 1:
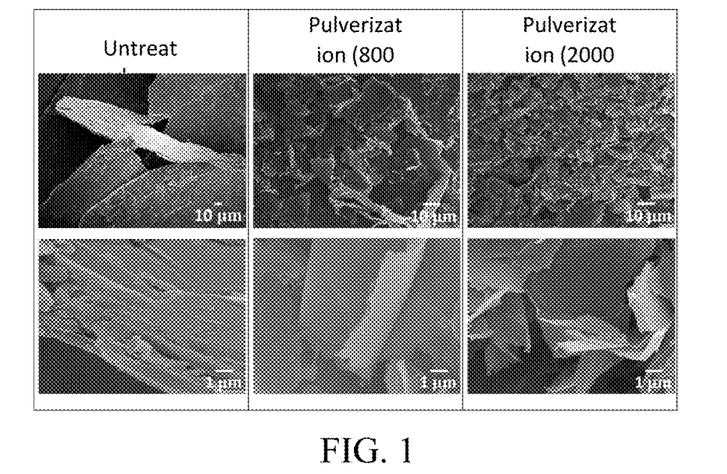
FIG. 1 are the images of scanning electron microscope (SEM) taken at specified magnification, in which the natural graphite is dispersed in water followed by the process of 800 bar or 2,000 bar for three times according to one embodiment of the present disclosure.
Figure 2A:
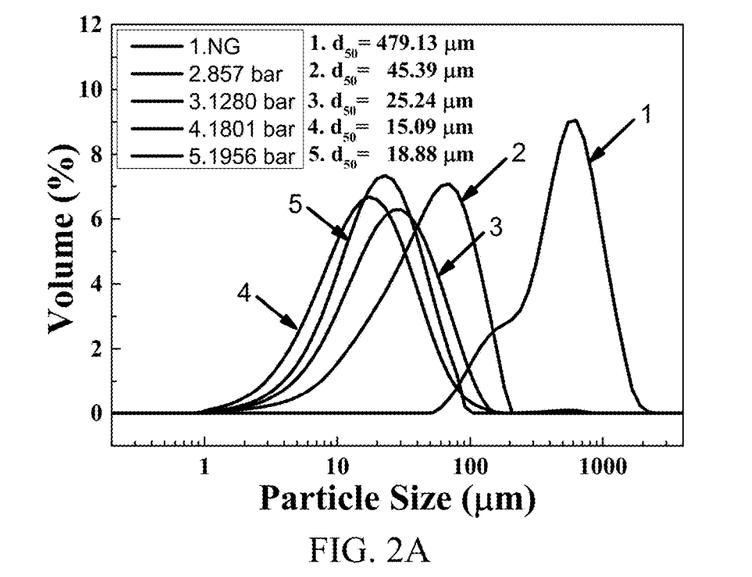
FIG. 2A is the curve depicting the particle distribution of graphene, in which the x-axis represents the particle size and the y-axis represents the percentage of volume.
Figure 2B:
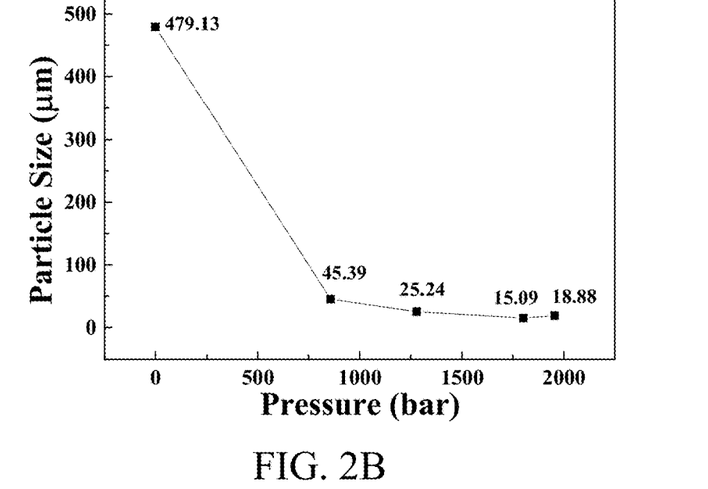
FIG. 2B is the diagram depicting the correlation between the pressure (x-axis) and the particle size (y-axis) according to one embodiment of the present disclosure.
Figure 3A:
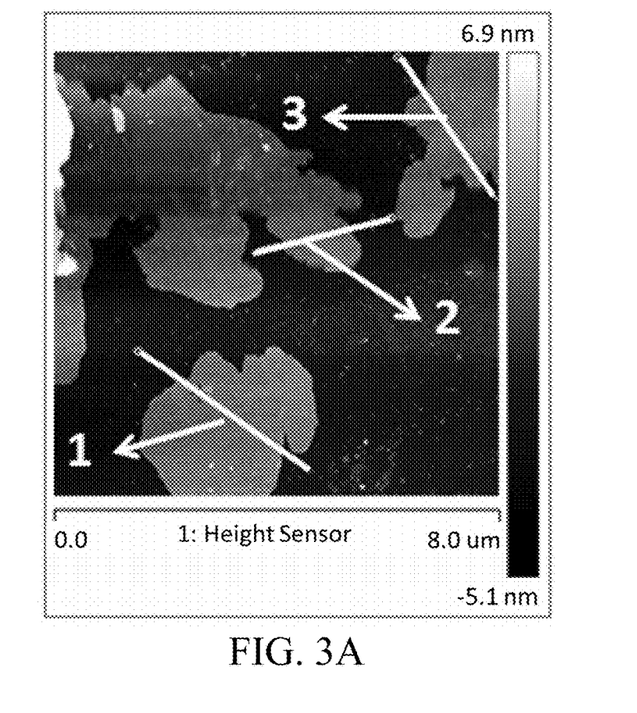
Figure 3B:
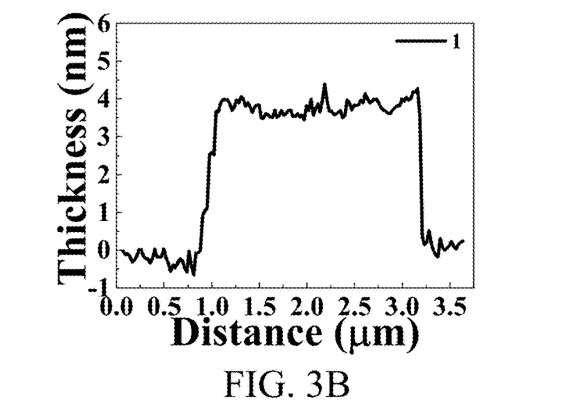
Figure 3C:
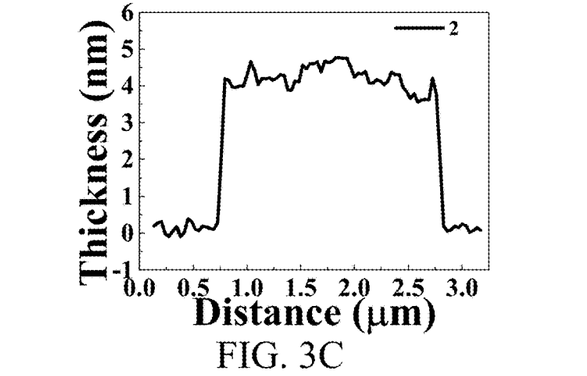
Figure 3D:
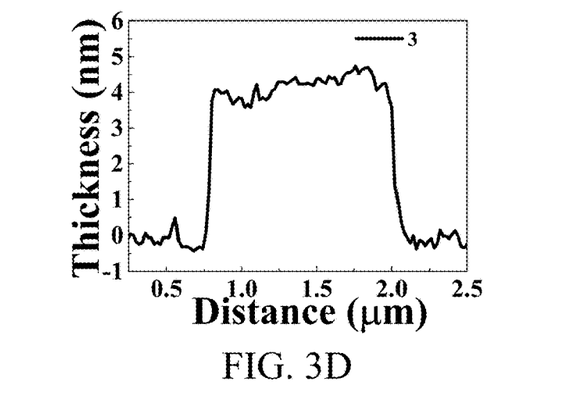

For the purpose of evaluating the effect of pumping pressure on the delamination of graphite, the suspension comprising graphite was pumped respectively at the pressures of 800 bar and 2,000 bar for three times. As the SEM data illustrated in FIG. 1, compared with the untreated control, the graphite pumped at 800 bar or 2,000 bar for three times was obviously sheared and exfoliated. The DLS assay further confirmed that the particle size of the thus produced graphene decreased, as the pumping pressure increased (FIGS. 2A-2B and Table 2).

TABLE 2

| Particle size ($d_{50}$) of graphene produced at various pressures | |
|---|---|
| Pumping pressure (bar) | $d_{50}$ (μm) |
| 0 (untreated control) | 479.13 |
| 857 | 45.39 |
| 1280 | 25.24 |
| 1801 | 15.09 |
| 1956 | 18.88 |

Three areas randomly selected from the graphene produced by 2,000 bar for three times were evaluated by AFM. The data revealed that the thickness of the selected areas were respectively 3.81 nm, 4.07 nm, and 4.79 nm; and the average thickness was about 4.22 nm (FIGS. 3A-3D).

Then, the pumping of graphite at 2,000 bar was repeated multiple times (i.e., pumping for 3, 8 or 12 times), each time using the product from the previous run as the starting material. Results are presented in Table 3 and FIGS. 4A, 4B, 5A and 5B, which collectively illustrated that the particle size of the produced graphene decreased with the increases in the number of repeats in the pumping step.

TABLE 3

| Particle size ($d_{50}$) of graphene produced at various repeats of the pumping step | | |
|---|---|---|
| Graphite | Pumping by 2,000 bar | $d_{50}$ (μm) |
| 1$^{st}$ test | 3 times | 18.88 |
| | 8 times | 11.31 |
| | 12 times | 8.53 |

TABLE 3-continued

Particle size ($d_{50}$) of graphene produced at various repeats of the pumping step

| Graphite | Pumping by 2,000 bar | $d_{50}$ (µm) |
|---|---|---|
| $2^{nd}$ test | Untreated control | 65.82 |
|  | 3 | 15.91 |
|  | 12 | 4.47 |

Figure 4A:
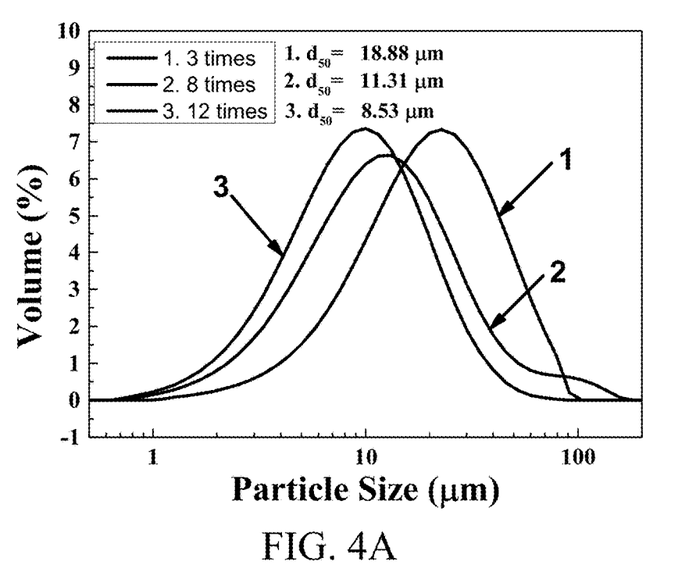
FIG. 4A is the curve depicting the particle distribution of graphene, in which the x-axis represents the particle size and the y-axis represents the percentage of volume.
Figure 4B:
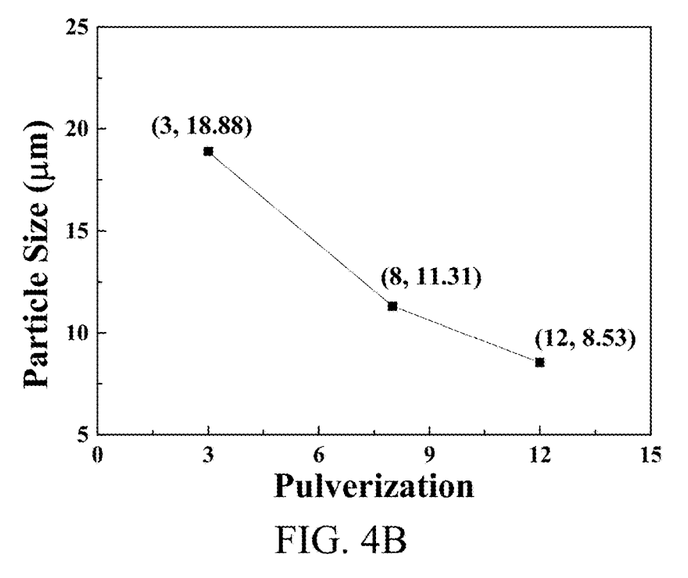
FIG. 4B is the diagram depicting the correlation between the pulverization (x-axis) and the particle size (y-axis) according to another embodiment of the present disclosure.
Figure 5A:
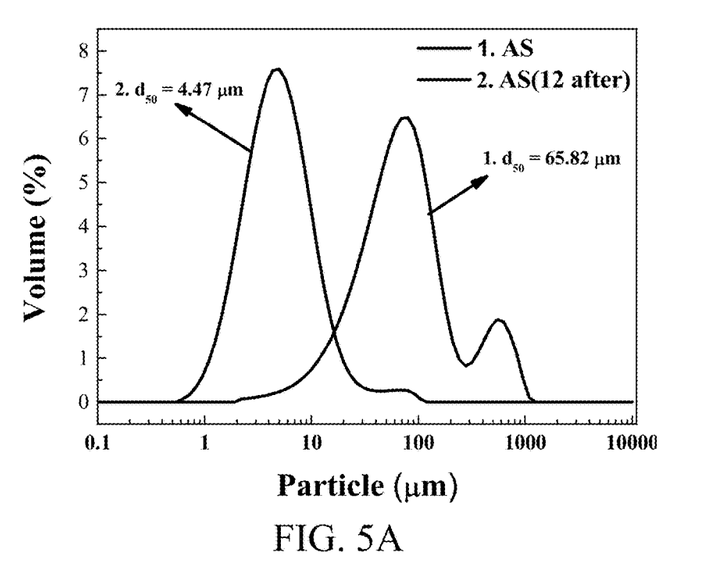
FIG. 5A is the curve depicting the particle distribution of graphene, in which the x-axis represents the particle size and the y-axis represents the percentage of volume.
Figure 5B:
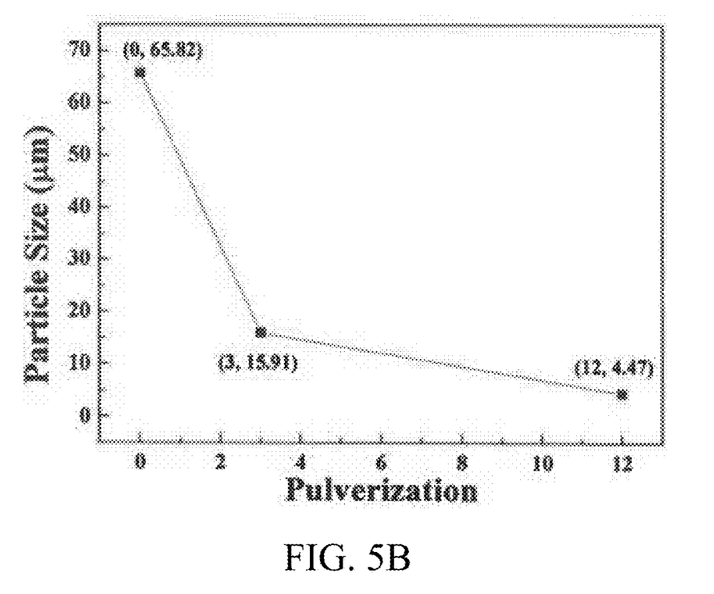
FIG. 5B is the diagram depicting the correlation between the pulverization (x-axis) and the particle size (y-axis) according to one embodiment of the present disclosure.
Figure 6:
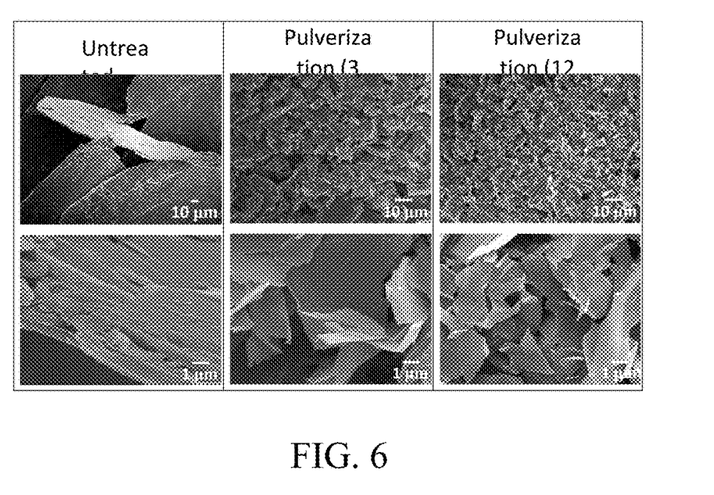
FIG. 6 are the images of SEM taken at specified magnification, in which the natural graphite is dispersed in water followed by the process of 2,000 bar for three or twelve times according to another embodiment of the present disclosure.
Figure 7:
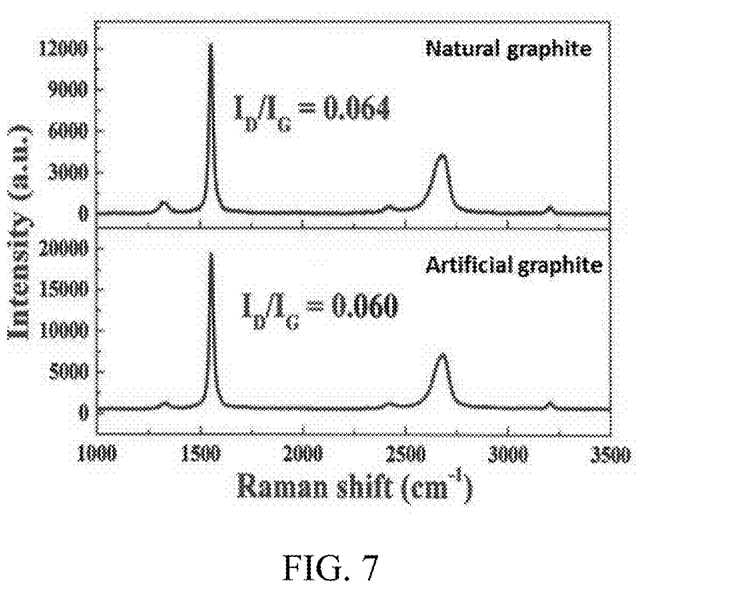
FIG. 7 are the diagrams analyzed by Raman spectroscopy, in which the x-axis represents the Raman shift and the y-axis represents the intensity; the upper panel and the lower panel respectively depict the Raman spectrum of natural graphite and synthetic graphite processed by 2,000 bar for three times.

The SEM image of FIG. 6 further confirmed the results of FIGS. 4-5. FIG. 7 illustrated Raman spectrum of the produced graphene (upper panel), in which the ration of D and G peak intensities ($I_D/I_G$) was 0.064.

Figure 8:
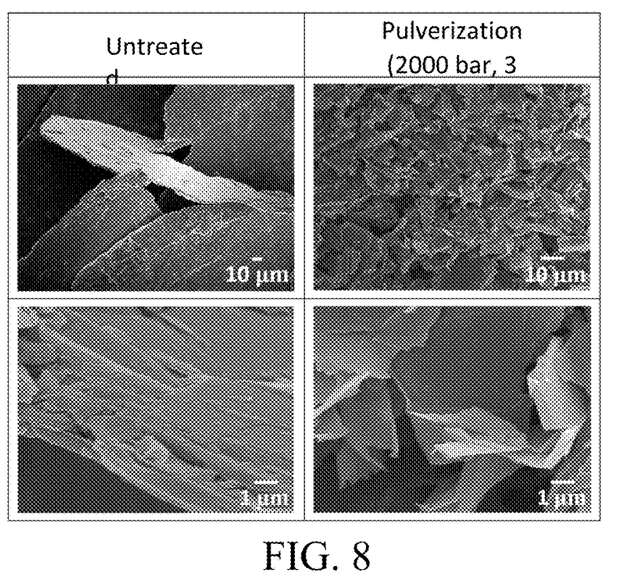
FIG. 8 are the images of SEM taken at specified magnification, in which the natural graphite is dispersed in 100% ethanol followed by the process of 2,000 bar for three times according to one embodiment of the present disclosure.

Alternatively, the natural graphene was dispersed in 100% ethanol to evaluate the pumping effect therein. Similar to the result observed in the case when water acted as the dispersion medium, after pumping through the nozzle at 2,000 bar for three times, the graphite was obviously delaminated, as compared with the untreated control (FIG. 8).

These data indicated that both the particle size and the thickness of the graphene decreased as the pumping pressure and/or the number of pumping repeat increased; and the thus produced graphene exhibited low-defect density.

Example 2 Production of Graphene from Synthetic Graphite

In this example, the synthetic graphite was employed as the starting material for the preparation of graphene. The results are illustrated in FIGS. 7, 9 and 10.

Figure 9:
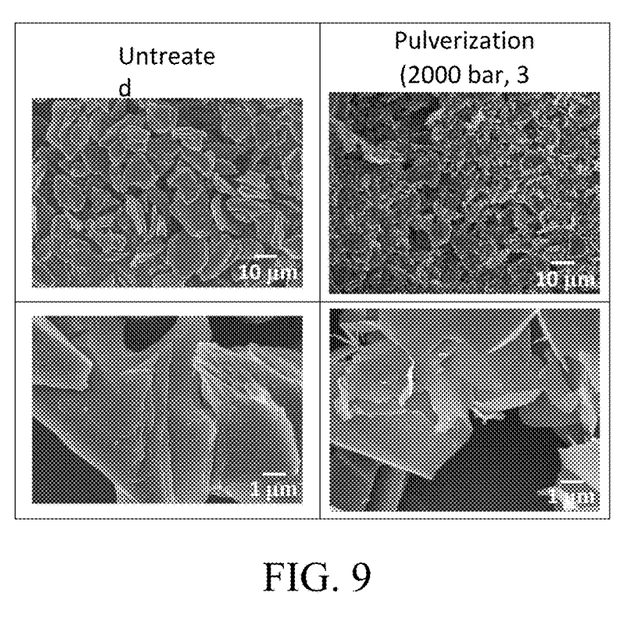
FIG. 9 are the images of SEM taken at specified magnification, in which the synthetic graphite is dispersed in water followed by the process of 2,000 bar for three times according to another embodiment of the present disclosure.
Figure 10A:
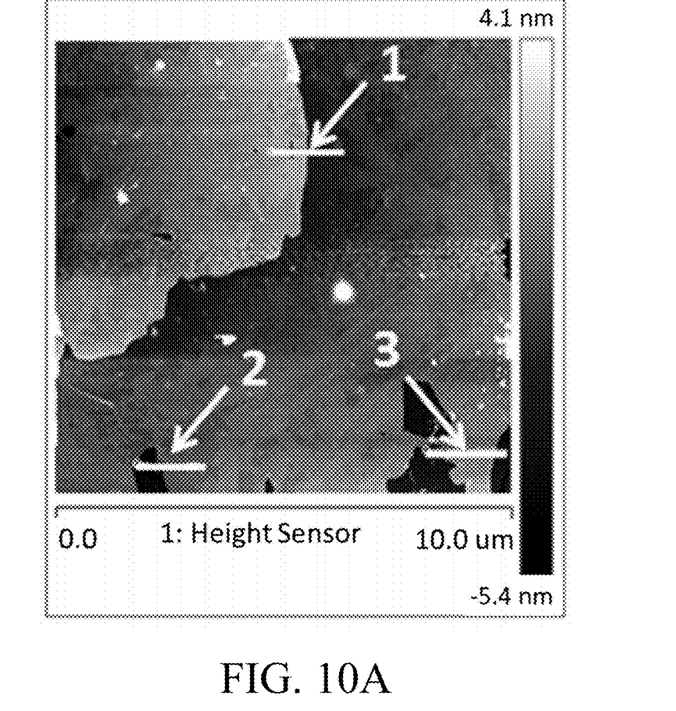
Figure 10B:
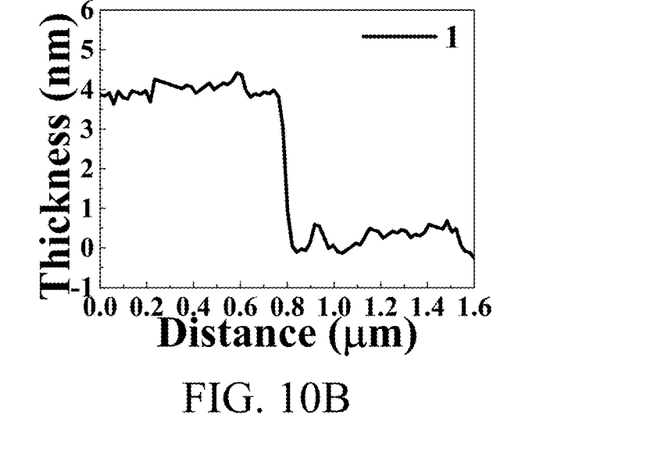
Figure 10C:
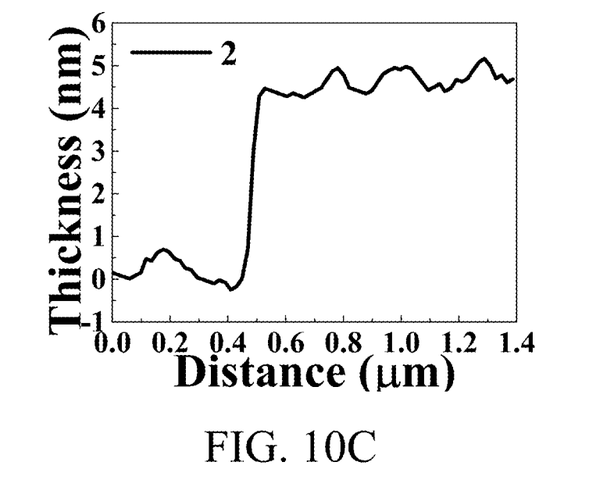
Figure 10D:
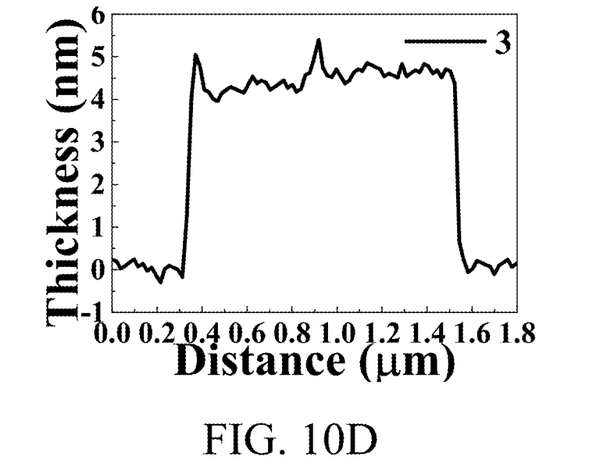

The SEM image indicated that compared with the untreated control, the synthetic graphite can be efficiently sheared and exfoliated by pumping at the pressure of 2,000 bar for three times (FIG. 9). The AFM data revealed that the average thickness of the graphene was about 4.11 nm (calculated from three randomly selected areas respectively having the thickness of 3.94 nm, 4.09 nm, and 4.29 nm, FIGS. 10A-10D). FIG. 7 illustrated Raman spectrum of the produced graphene (lower panel), in which the $I_D/I_G$ value was 0.060.

In conclusion, the present disclosure provides a method of producing a graphene from a graphite material (e.g., natural graphite or synthetic graphite). The present method comprises subjecting the graphite material to the pressure of at least 800 bar under low temperature. The present method also characterizes in not having the need to use any chemical reagent and sonication treatment; and the thus-produced graphene exhibits low-defect density and high uniformity.

It will be understood that the above description of embodiments is given by way of example only and that various modifications may be made by those with ordinary skill in the art. The above specification, examples and data provide a complete description of the structure and use of exemplary embodiments of the invention. Although various embodiments of the invention have been described above with a certain degree of particularity, or with reference to one or more individual embodiments, those with ordinary skill in the art could make numerous alterations to the disclosed embodiments without departing from the spirit or scope of this invention.

What is claimed is:

1. A method of producing a graphene from a graphite material, comprising,
   (a) dispersing the graphite material in a solution to form a graphite suspension that consists of graphite and the solution; and
   (b) shearing and exfoliating the graphite material to produce a graphene-containing solution by subjecting the graphite suspension at a pressure of at least 800 bar and a temperature no more than 30° C.; and
   the method is characterized in not having the step of sonicating the graphite suspension.

2. The method of claim 1, wherein the pressure is between 800-3,000 bar.

3. The method of claim 2, wherein the pressure is 2,000 bar.

4. The method of claim 3, wherein in the step (b), the graphite suspension is pumped through a nozzle of an ultra-high pressure (UHP) reactor multiple times.

5. The method of claim 4, wherein in the step (b), the graphite suspension is pumped through the nozzle of the UHP reactor three times.

6. The method of claim 5, the graphene has an average thickness of about 3-5 nm, and a particle size ($d_{50}$) about 10-20 µm.

7. The method of claim 4, wherein in the step (b), the graphite suspension is pumped through the nozzle of the UHP reactor eight times.

8. The method of claim 7, wherein the particle size ($d_{50}$) of the graphene is about 10-15 µm.

9. The method of claim 4, wherein in the step (b), the graphite suspension is pumped through the nozzle of the UHP reactor twelve times.

10. The method of claim 9, wherein the particle size ($d_{50}$) of the graphene is about 1-10 µm.

11. The method of claim 1, wherein in the step (b), the temperature is about 10-20° C.

12. The method of claim 1, wherein the solution is selected from the group consisting of water, methanol, ethanol, 1-propanol, isopropanol, butanol, isobutanol, ethylene glycol, diethylene glycol, glycerol, propylene glycol, N-methyl-pyrrolidone (NMP), γ-butyrolactone (GBL), 1,3-dimethyl-2-imidazolidinone (DMEU), dimethyl formamide, and a combination thereof.

13. The method of claim 12, wherein the solution is water.

14. The method of claim 12, wherein the solution is ethanol.

15. The method of claim 12, wherein the solution is the combination of water and ethanol.

16. The method of claim 1, wherein the graphite material is selected from the group consisting of, natural graphite, synthetic graphite, spheroidal graphite ion, carbon fiber, carbon nanofiber, carbon nanotube, mesophase carbon micro-bead, and the combination thereof.

17. The method of claim 1, wherein the method does not comprise the step of adding a reducing agent, an oxidizing agent, an acid or an alkaline to the graphite suspension.

* * * * *